United States Patent [19]

Grigg

[11] Patent Number: 4,579,434
[45] Date of Patent: Apr. 1, 1986

[54] LARGE FORMAT PHOTOGRAPHIC APPARATUS

[76] Inventor: Robert L. Grigg, 4123 N. Crest Dr., Manhattan Beach, Calif. 90266

[21] Appl. No.: 520,697

[22] Filed: Aug. 5, 1983

[51] Int. Cl.$^4$ .................... G03B 15/00; G03B 29/00
[52] U.S. Cl. .................................. 354/81; 354/293; 352/132; 352/243
[58] Field of Search ................... 354/80, 81, 293; 352/39, 44, 53, 85, 89, 132, 243

[56] References Cited

U.S. PATENT DOCUMENTS

| | | | |
|---|---|---|---|
| 2,599,624 | 6/1952 | Gillette | 352/89 |
| 4,498,744 | 2/1985 | Ealovega et al. | 352/132 |
| 4,515,455 | 5/1985 | Northmore | 354/293 |

Primary Examiner—A. A. Mathews
Attorney, Agent, or Firm—Paul D. Supnik

[57] ABSTRACT

Large format photographic apparatus for creating the illusion of vehicle motion has a winch frame for supporting a cable arrangement and for simultaneously pulling two separate cables. A first cable is coupled to a subject vehicle to be photographed. The second cable is coupled via a linkage translator to a moveable platform mounted camera cart. The platform has a pair of spaced apart rails having inwardly facing surfaces and the cart has laterally disposed resilient wheels engaging the rails whereby transverse vibrational motion is reduced. Beyond the subject vehicle is an upright triangular weight bearing structure. A separate cable coupled from the rear of the vehicle being photographed to the weight balances and maintains an inertial drag on the vehicle to smooth out the motion of the cable of the vehicle. Similarly a separate cable coupled from the cart is coupled to a different upright triangular weight bearing structure. In operation, a winch on the winch frame is rotated, causing simultaneous pulling of the subject vehicle and the cart. During this time the film in the camera is exposed, creating a sharp image of the vehicle, yet with somewhat blurred wheels, thus providing the image of a moving vehicle.

18 Claims, 7 Drawing Figures

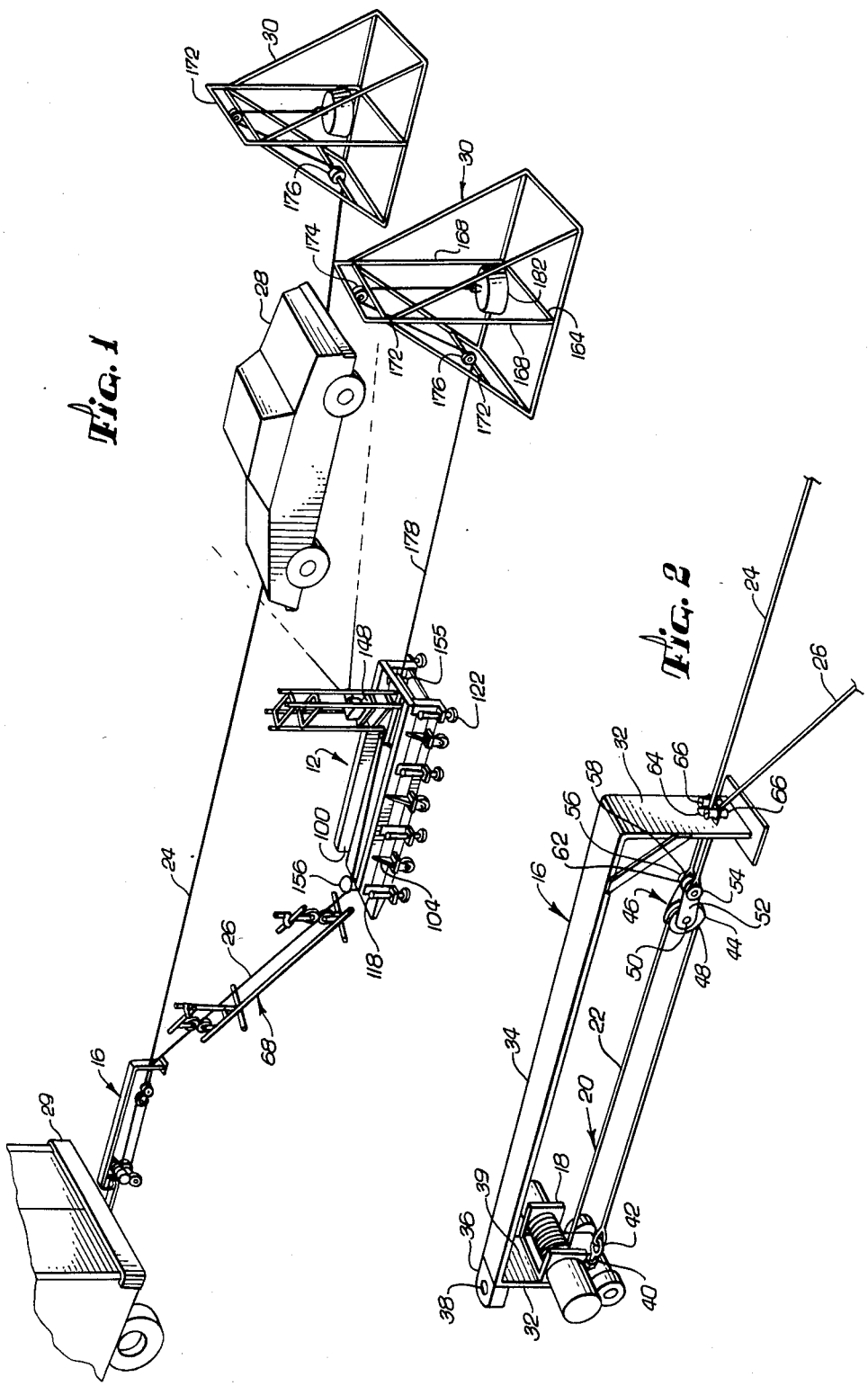

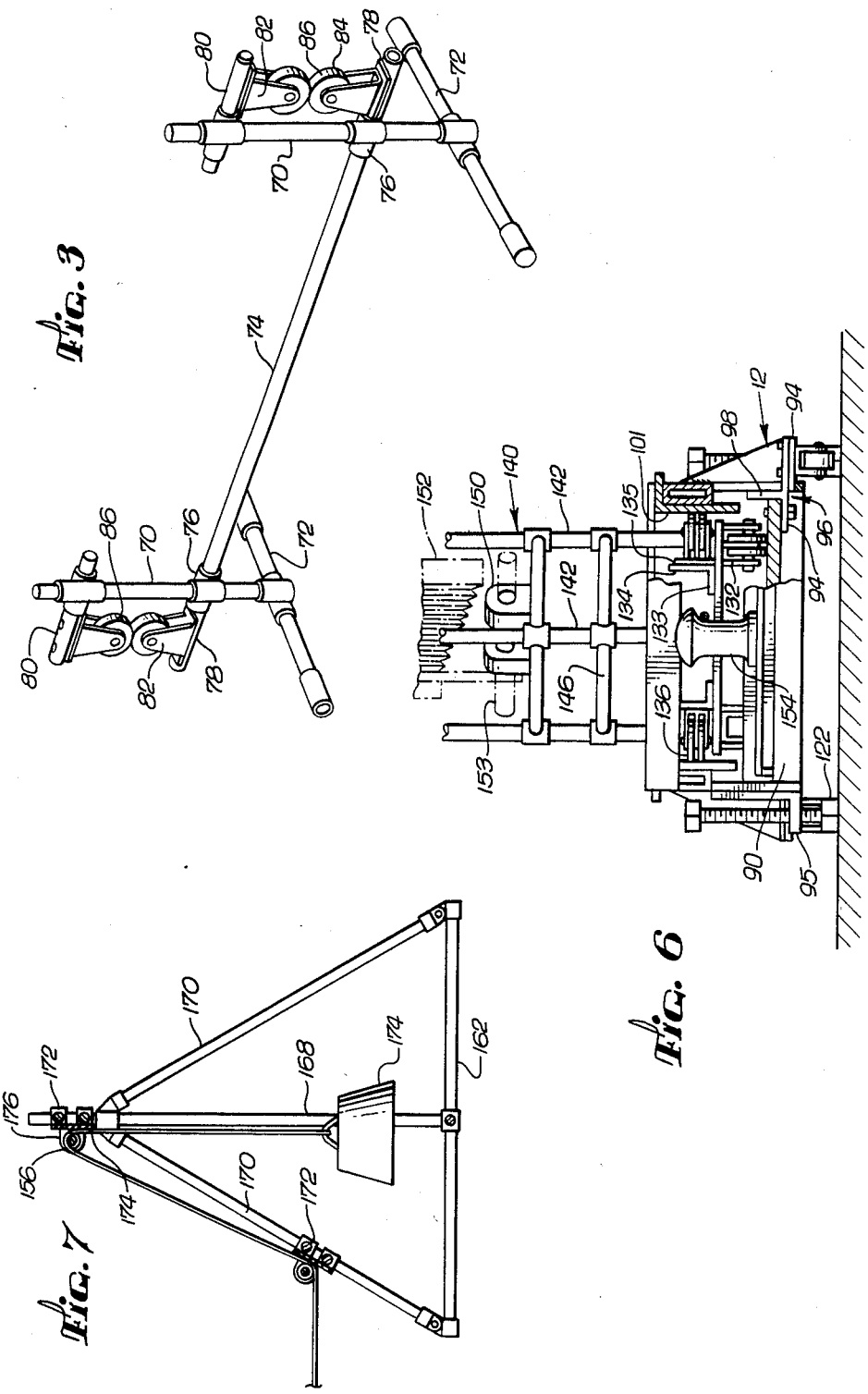

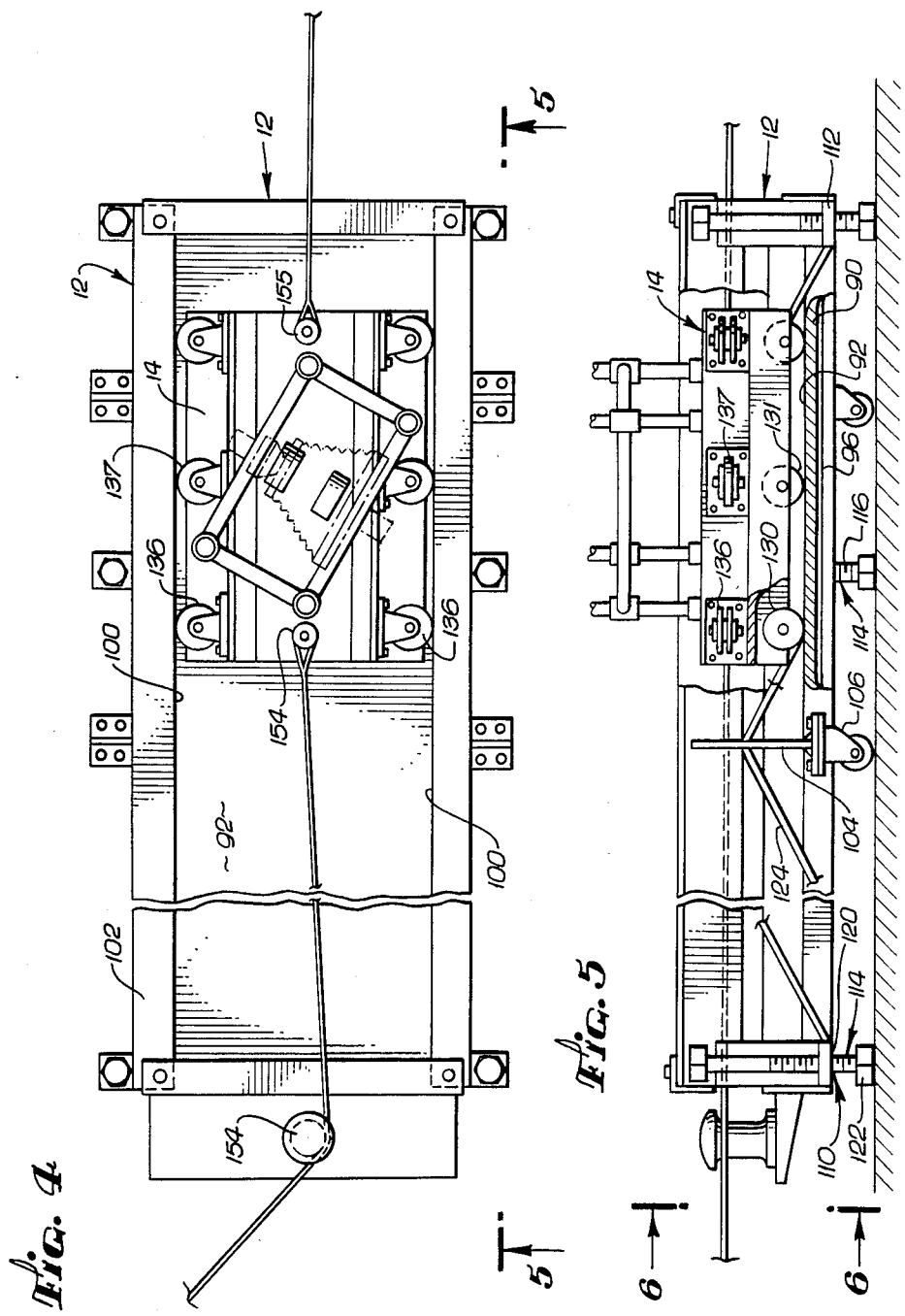

LARGE FORMAT PHOTOGRAPHIC APPARATUS

BACKGROUND OF THE INVENTION

1. Field of the Invention

This invention relates to camera apparatus for photographing vehicles. More particularly, the invention relates to a system for utilizing large format cameras for photographing still images of vehicles appearing to be in motion.

2. Description of the Prior Art

In the advertising industry in particular, it is often necessary to obtain photographs of vehicles, capturing the image of motion. One of the techniques that have been used to create the illusion of motion is by moving the camera by hand or on a tripod in a a panning action utilizing a time exposure. By doing this, the vehicle generally appears in focus while the background will be blurred and the rotation of the wheels will appear blurred. Large format photography is desirable to achieve crisp, sharp color images required in many advertising industry applications such as catalogs. By large format, it is meant 4"×5" (10 cm.×13 cm.) or larger, or typically 8"×10" 20 cm.×26 cm.). While this does in some sense achieve that feeling or illusion of motion, the technique is not suitable for large format photography. As indicated, large format photography is desirable to achieve crisp sharp images required in many advertising industry applications. While this technique may be acceptable with 35 mm cameras, which are reasonably light and easily moved by hand, it becomes much more difficult when using a large format camera. The reason for this is that the large format view camera such as the 8"×10" (20 cm.×26 cm.) camera is far heavier. The advantages acheived by this larger camera in terms of image sharpness are significantly lost when vibration or hand held photography is introduced.

Various other techniques have been used in connection with hand held photography, attempting to create the illusion of motion. For example, some have utilized a false blurred background. This, however, results in vehicle wheels which appear frozen rather than moving. Thus it would be desirable to have more effective techniques or apparatus available for large format photographing of vehicles.

SUMMARY OF THE INVENTION

This system for photographing vehicles creating the illusion of motion generally comprises an arrangement for simultaneously pulling the subject vehicle to be photographed and a cart supporting a camera in spaced apart relationship. Means are provided to reduce vibrations which would otherwise result to the camera.

In a preferred example of the invention, a primary cable assembly is coupled to a winch to provide travel of the vehicle and the cart. First and second cables coupled to the primary cable assembly are coupled respectively to the subject vehicle and the cart and transmit a lateral pulling motion. The cart is disposed on a platform and the cart is movable longitudinally within the platform. Laterally disposed resilient wheels on the cart engage longitudinal rails of the platform and thereby limit transverse motion of the cart during its longitudinal travel. The cart rides on wheels axially fixed normal to the free direction of travel, which combines with the laterally disposed wheels to further limit vibration. Longitudinal vibration is reduced by a weight which extends beyond and coupled to the cart and is supported by an inertial control structure.

Additional features in accordance with this invention include a winch frame having an upright portion for supporting the winch and an eye bolt. A winch cable extends through a cable assembly and back to the eye bolt. A spaced apart upright porton of the frame is apertured for receiving the two cables. Guide pulleys on the exterior of the frame adjacent the aperture guides the second cable and translates the direction of motion of the second cable, which along with a linkage arrangement allows the second cable to further turn so that the coupling to the cart is such that the cart travels generally parallel to the subject vehicle.

BRIEF DESCRIPTION OF THE DRAWINGS

The nature of the invention described herein may be best understood and appreciated by the following description taken in connection with the accompanying drawings in which:

FIG. 1 is a diagrammatic perspective view of large format photographic apparatus in accordance with this invention;

FIG. 2 is a plan view of a portion of the system depicted in FIG. 1;

FIG. 3 is an elevational view taken along lines 3—3 of FIG. 2;

FIG. 4 is a perspective view of a portion of the system depicted in FIG. 1;

FIG. 5 is an elevational view of a portion of the invention depicted in FIG. 1;

FIG. 6 is an elevational view taken along lines 6—6 of FIG. 5;

FIG. 7 is a detailed elevational view of a portion of the system depicted in FIG. 1.

DETAILED DESCRIPTION

With particular reference to FIG. 1, large format photographic apparatus in accordance with this invention generally comprises a platform 12 for causing motion of a camera cart 14 in syncronization with motion of a slow moving vehicle 15 to be photographed. The cart 14 is pulled by a cable 17 extending from a winch frame 16. The winch frame 16 supports a winch 18 and a primary cable assembly 20 joined to the winch 18. Coupled to the primary cable assembly 20 is a secondary cable arrangement comprising a first drive cable 24 and a second drive cable 26. The first drive cable 24 is coupled to the subject vehicle 28 to be photographed. The second drive cable 26 is coupled to the cart 14. Beyond the platform 12 is a weighted pulley structure 30 which is coupled to the cart 14. Beyond the subject vehicle 28, a similar pulley structure 30 is also coupled to the subject vehicle 28.

The winch frame 16 comprises a pair of spaced apart upright support members 32 and a laterally disposed longitudinal member 34 joining the upright support members 32. Extending from the longitudinal member 34 is an overhang portion 36 having trailer hitch aperture 38 therein. The upright spaced apart support members 32 have a facing inner surface 39 and the facing inner surface 39 of the support member 32 adjacent to the overhang portion 36 has an electric winch 18 joined thereto. The winch has an axis of rotation normal to the longitudinal member 34. Spaced apart beneath the winch 18 is an eye bolt 40 which is joined to the same upright support member 32 and the winch 18. The eye bolt 40 has a circular eye portion 42 extending inwardly of the winch frame 16. The primary cable 22 extends from the winch 18. The primary cable assembly 20 is doubled over and returned by a pulley 44 to the eye bolt 40. The primary cable assembly 20 being doubled over, provides a smooth reduced travel of increased torque to the secondary cable arrangement.

The primary cable assembly 20 in addition to a primary cable 22 comprises a pulley arrangement 46 best shown in FIG. 2. The pulley arrangement 46 comprises a pulley 48 mounted axially on an axel 50 extending through a pulley block comprising a pair of spaced apart parallel plates 52 sandwiching the pulley 48 therebetween. Spaced apart from the axis of the pulley 48, a rod 54 passses through the plates 52 about an axis parallel to the pulley axis. On oppposite sides of the rod 54 are disposed retaining guides 56 for receiving the secondary cable arrangement. The guides 56 comprise circular washers 58 and are retained in place by bolts 60. Between the washers 58 are disposed circular resilient bumpers 62 for dampening vibrations. The first and second drive cables 24, 26 are placed between the bumpers 62.

The support member 32 opposite the support member which holds the winch 18, has an aperture for receiving the first and second drive cable 24, 26. Mounted on that support member 32 and on opposite sides of the aperture 64 are a pair of spaced-apart guide pulleys 66 for guiding the first and second drive cables 24, 26 while preventing interference with the aperture 64. The first and second drive cables 24, 26 thus extend from the primary cable assembly 20 through the aperture 64 and about the guide pulleys 66.

Supporting the second drive cable 26 downstream from the winch frame 14 is a cable linkage support 68 as best viewed in FIGS. 1 and 3. The cable linkage support 68 comprises a pair of spaced apart upright pipes 70. At the bottom of each pipe 70 is disposed a base pipe 72 rotatable about the upright pipes 70. The base pipes 72 are disposed in spaced apart parallel relationship to one another. A longitudinal brace pipe 74 couples the upright pipes 70 to one another by a brace linkage 76. The base pipes 72 are rotatable so that the linkage support can be positioned upright when in use and rotated to generally a single plane for storage. An overhang portion 78 on the longitudinal brace pipe 74 extends beyond each of the upright pipes 70 to provide support for a cable guide arrangement. A pair of laterally disposed support pipes 80 are cantilevered from the upright pipes 70 and are disposed in parallel spaced apart relationship to the overhang portion 78 of the longitudinal brace pipe 74. A pair of mating roller frames 82 extend inwardly from the overhang portion 78. Laterally disposed support pipes 80 each support a moveable roller 84. The moveable rollers 84 are rotatable about a parallel axis normal to the longitudinal brace pipe 74 and normal to the upright pipes 70. One of each pair of the moveable rollers 84 contains a groove 86 for receiving the second drive cable 26. The line of travel of the second drive cable is slightly spaced apart from the upright pipes 70 so as to prevent interference of the second drive cable 25 with the upright pipe 70.

With particular reference to FIGS. 1, 4, 5 and 6, the platform 12 comprises a 3 cm. slab 90 of aluminum having a top surface 92. The aluminum slab 90 is mounted on base portions 94 of angle irons 96 disposed longitudinally. The angle irons have upwardly extending sides 98 normal to the base portions 94. Above the side 96 and generally parallel thereto are a pair of inwardly directed rails 100 having inwardly directed wheel engaging surfaces 101. They are rigidly coupled to the sides 98 by a longitudinal structural member 102. A post 103 is coupled to the platform at the end adjacent the linkage support 68 to receive the second drive cable 26. For smoothest travel, the post 103 may be a pulley to further reduce vibrational disturbance.

Extending outwardly normal from the sides 98 and also joined to the longitudinal structural members 102 are a plurality of spaced apart triangular brace plates 104. Wheel supports 106 disposed beneath and joined to the brace plates 104 support a plurality of wheels for allowing the platform 12 to be transported to appropriate locations. A pair of "L" brackets 110 having arms 112 extending outwardly are disposed longitudinally along the outside of the platform 12 adjacent the base 94 for supporting a plurality of levelers 114. The levelers 114 comprise coarse threaded bolts each having a threaded portion 116 and head 118 for turning the threaded portion 116. The arms 112 have threaded apertures 120 mating with the threaded portions 116 so that the position of the threaded portion 116 with respect to the arms 112 can be adjusted. Beneath the arms 112 are disposed feet 122 for contact with the ground. Additional brace members 124, linking the base 94 and the sides are provided for added strength.

The cart 14, as best viewed in FIGS. 1, 4, 5 and 6 comprises a rectangular aluminum plate approximately 1¼ inch (3 cm.) in thickness having plural pairs of double wheels 130 axially disposed normal to the length of the cart 14. In addition to the wheels 130, intermediate wheels 131 are disposed intermediate the double wheels 130. The use of double wheels 130 and intermediate wheels 131 aids the smooth travel of the cart 14 along the platform surface, compensating for any minor imperfections in the surface 92 of the slab 90. Longitudinal ribs 132 extend downward from the cart 14. The ribs 132 extend parallel to the length of the cart 14. Two sets of the ribs 132 are disposed on both sides of the cart and are apertured for axially supporting the wheels 130. The positioning of the ribs 132 and the wheels 130 provide longitudinal travel of the cart 14 along the length of the platform 12.

Above the cart 14 are a pair of facing wheel supporting "L" brackets 134 longitudinally disposed on the cart 14. The "L" brackets have a lateral portion 133 joined to the cart 14 and an upright portion 135 normal to the lateral portion for receiving and mounting a set of lateral wheels 136. The lateral wheels 136 are double wheels as best viewed in FIGS. 5 and 6. In addition, single wheels 137 are disposed intermediate each set of double wheels on each side of the cart 14. The lateral wheels 136 and intermediate wheels 137 are axially mounted to plates 138 which are joined to the upright portion 135 of the "L" bracket 134. The lateral wheels 136 are positioned outwardly against the inner surfaces 101 of the rail 100 such that each of the wheels 136 engages the rail 100. The use of double wheels and intermediate wheels enhances the stability of travel along the rails 100 and tends to compensate for slight imperfections.

A camera support arrangement 140 is mounted above the cart 14. The camera support arrangement 140 comrises a plurality of upright member or pipes 142 disposed within pipe support holders 144. Lateral braces 146 are provided to stiffen and join the upright pipes 142 to provide a rigid framework for supporting a camera. Certain of the brace pipes 146 are used to support a table 148 to which view camera clamps 150 are joined. An 8"×10" view camera 152 has a journal 153 positioned within the view camera clamps 150.

A cable connector 154 is centrally joined at one end of the cart 14 for receiving the second drive cable. The cable connector 154 includes a pair of spaced apart resilient elements 156 for dampening vibration from the second drive cable. A second cable connector 155 is disposed at the opposite end of the cart for attachment to a weight coupled cable 158. It may also be helpful to utilize a post such as post 154 the platform adjacent the cable connector 155, in conjunction with a pulley ofset on the cart adjacent connector 155.

As best viewed in FIGS. 1 and 7, the weighted pulley structure 30 disposed beyond the cart 114 comprises a base pipe arrangement. The base pipe arrangement comprises a rectangular array of four members such as base pipes 162 rigidly joined at their ends and a central transverse base pipe 164 is an upright pipe 168 and at each end of the longitudinal pipes are obliquely disposed pipes 170. The obliquely disposed pipes 170 form a triangular configuration with the upright pipe 168. A pair of closely spaced apart transverse pipes 172 are positioned across and disposed normal to a pair of he spaced apart parallel obliquely disposed pipes 170. A plate 174 is centrally mounted on the transverse pipes 172. The plate 174 supports a dampening pulley 176 having a pair of resilient elements 156. The purpose of the pulley 176 is to receive a cable 178 in a low vibration environment. At the top of the upright pipes 167, a second pair of closely spaced apart transverse pipes 172 are disposed. Similarly, a plate 174 is centrally disposed on these transverse pipes 172 and a dampening pulley 176 is joined to these transverse pipes 172. A cable 178 extending from the end of the cart 14 bears on the inner portion of the lower pulley 176 and over the upper pulley 176 and terminates in a weight 182. Typically, the weight is on the order of 30 pounds (14 kg.).

A similar triangular structure 30 is coupled to the subject vehicle 28 and carries a weight 182 typically on the order of 50 pounds (23 kg.).

In operation it should be kept in mind the objective of the apparatus, that is to produce photographs using a large format camera 152 which creates the illusion of a vehicle in motion. The manner in which this system operates is that a subject vehicle 28 and the view camera are disposed in a parallel relationship and are simultaneously moved at the same speed for example, 0.2 m/sec. The movement of the vehicle 28 creates a blurred movement of the wheels 23 while the rest of the vehicle 28 appears sharp on the image created.

The winch 18 is electrical and is typically coupled to a storage battery on a truck 29. The winch frame 16 is joined at the back of the truck 29 on a trailor hitch for support. When the winch is energized, it rotates and winds the primary cable 22 causing a movement of the primary cable assembly 20 towards the winch 18 at approximately half the speed that the primary cable 22 is wound on the winch 18. The movement of the primary cable assembly 20 in turn causes a movement of the first drive cable 26, causing a pulling of the subject vehicle 28 and simultaneously causes a pulling of the second drive cable 26 at the same speed as the first drive cable 24. The second drive cable 26 is pulled over the guide pulley 66 of the winch frame 16 as the second drive cable 26 emerges through the aperture 64 of the winch frame 16 and then the second drive cable 26 is pulled through the moveable rollers 84 of the cable linkage support 68. The cable linkage support 68 allows some variation in the positioning of the cart 12 to which the second drive cable 26 is attached.

Before starting the process, the levelers 114 are rotated until their feet 122 engage the ground so that the platform 12 is then supported by the levelers 114 rather than by the wheels 108. This prevents movement of the platform 12 during an operation. Thus, when the second drive cable 26 pulls the cart 14, there is no moton of the platform 12. During the rotation of the winch 18 an exposure on the view camera 150 is begun. Typical exposures might be on the order of 10 seconds, using a suitable f stop film speed combination. To obtain full advantage of the sharpness from the large negative format, it is vital that the camera be moved with as little vibration and longitudinal or transverse movement as possible. This is acheved by the dampeners on the varous pulleys and by the wheels 130 in which the longitudinal movement is limited by the wheel direction as indicated in FIG. 3 while the lateral wheels 136 engage the internal side rails 100. To prevent whip sawing action and to further dampen the effect of a pulling by the winch 18, the weighted pulley structure 30 maintains stability in the direction of motion of the cart. Similarly, the weighted pulley structure 30 coupled to the subject vehicle prevents any jerking of the vehicle and smoothes out the longitudinal and vibrational motion of the vehicle.

While the invention has been described with reference to specific forms thereof, it will be understood that changes and modifications maybe made within the spirit and scope of this invention.

What is claimed is:

1. Apparatus for photographing in large format the image of a vehicle appearing to be in motion comprising:
   means for pulling two separated objects simultaneously, the pulling means comprising first means for pulling a subject vehicle to be photographed along a first axis and second means for pulling cart means coupled to a camera along a second axis spaced apart from and nominally parallel to the first axis;
   cart means for movably supporting a camera;
   large format camera means for photographing the vehicle, the camera means coupled to the cart means;
   means for dampening vibrations of the camera means when the cart means is pulled by the second pulling means, whereby a sharp image of the subject vehicle may be obtained, yet having an at least partially blurred wheel image, thereby creating a sharp image of a vehicle appearing to be in motion;
   means for moving the cart means along a nominally horizontal plane with minimal vibration; and
   resilient wheel means for limiting transverse vibration of the cart, the resilient wheel means being laterally disposed about a vertical axis, coupled to the cart means and engaging said second means.

2. The invention as set forth in claim 1 and comprising linkage means for guiding the second means to the cart means to maintain spacially separated the subject vehicle from the camera support means yet allowing the simultaneous pulling of the subject vehicle and the cart means, the linkage means coupled to the second means and comprising spaced apart guides means for directing the second means to the cart along the first axis nominally parallel to the second axis.

3. The invention as set forth in claim 1 and comprising inertial dampening means for minimizing longitudinal vibrations of the subject vehicle and the camera means, the inertial dampening means comprising a weight and means for supporting the weight for exerting a generally constant force on the cart generally along the second axis, disposed downstream of the cart means and coupled to the cart means.

4. The invention as set forth in claim 3 and in which the inertial dampening means comprises vehicle motion dampening means for dampening irregular movement of the vehicle during photographing, the vehicle motion dampening means coupled to the subject vehicle downstream of the second means.

5. Apparatus for photographing in large format, the image of a vehicle appearing to be in motion comprising:
   winch frame means for supporting a winch;
   primary cable means for moving secondary cable means;
   winch means for moving the primary cable means, the winch means coupled to the winch frame;
   secondary cable means for transmitting motion to a vehicle and to a camera cart, the secondary cable means comprising first and second cable means, the first cable means for causing a travel of a subject vehicle and the second cable means for causing travel to a of the camera cart;
   a subject vehicle coupled to the first cable means;
   cart means for moving a large format camera, the cart means coupled to the second cable means;
   platform means for supporting the cart, the platform means comprising a base and a plurality of wheels supporting the base;
   the base having a smooth top surface for receiving the cart;
   the cart being longitudinally moveable within the platform means, the cart having a plurality of laterally disposed wheels mounted along axes normal to the base for moving the cart in a longitudinal direction and stabilizing the transverse motion of the cart with respect to the platform means;
   parallel guide rails disposed normal to and along the longitudinal length of the platform means, the laterally disposed wheels of the cart engaging the parallel guide rails to maintain transverse stability of the cart within the platform means;
   means coupled to the cart for increasing the inertial load of the cart and dampening cart vibrations;
   whereby a rotation of the winch causes the secondary cable means to simultaneously pull the vehicle, and pull the cart within the frame, the cart moving along a stabilized substantially vibration free path to capture on large format film the illusion of motion of the vehicle.

6. The invention as set forth in claim 5 and comprising a cable linkage, the cable linkage comprising:
   a longitudinal member;
   a parallel pair of spaced apart upright members mounted to the longitudinal member and a base member mounted to each of the longitidinal members, the base members for supporting the cable linkage in an upright position; and
   cable guides supported by and adjacent the upright members, each cable guide comprising a pair of cable engaging rollers, and further comprising groove means in at least one of the rollers for receiving the cable, the rollers comprising a resilient material to dampen vibrations during motion of the cable therethrough.

7. The invention as set forth in claim 6 and in which the means coupled to the cart for increasing the inertial load of the cart comprising a weight supported structure for supporting a weight coupled to the cart, the structure comprising means for supporting a first pulley;
   means for supporting a second pulley elevared above and laterally spaced apart from the first pulley; and
   means for coupling a weight to a cable across the first and second pulleys and to the cart.

8. The invention as set forth in claim 7 and in which the weight supporting structure comprises:
   a base frame structure;
   an obliquely disposed structure mounted to the base frame for transversely supporting a first pulley in a vertical plane and about a lateral axis; and
   means coupled to the base frame for transversly supporting the second pulley in the vertical plane of the first pulley and spaced apart from and above the first pulley.

9. The invention as set forth in claim 5 and in which:
   the winch frame comprises base means for supporting the winch frame;
   a first upright element for receiving the winch; winch means mounted to the first upright element;
   a second upright element spaced apart from the first upright element, the second upright element comprising aperture means and a pair of pulleys disposed on opposite sides of the aperture means;
   a winch cable coupled from the winch and comprising a cable assembly; and
   the cable means comprising a pulley coupled to the winch cable, and a pair of dampened secondary cable couplings joined to the first pulley.

10. The invention as set forth in claim 5 and comprising a structure for supporting the weight coupled to the cart, the structure comprising means for supporting a first pulley elevated with respect to the cart;
    means for supporting a second pulley at a higher level than the first pulley and spaced apart therefrom; and
    means for coupling a weight to a cable across the first and second pulleys and to the cart.

11. The invention as set forth in claim 10 and in which the means coupled to the cart for incresing the inertial load of the cart comprising:
    a base frame structure;
    a structure mounted to the base frame for transversly supporting a first pulley; and
    means coupled o the base frame for transversely suppporting the second pulley positoned at avertical plane spaced apart from the vertical plane passing through the first pulley; and the invention further comprising means coupled to the subject vehicle for increasing the inertial load of the subject vehicle.

12. A system for photographing in large format, the image of a vehicle appearing to be in motion comprising:
    winch frame means for supporting a winch, the winch frame comprising a longitudinal member and spaced apart upright means for supporting the longitudinal member;

primary cable means for moving secondary cable means;

winch means including a motor for moving the primary cable means, the winch means coupled to to one of the spaced apart upright means of the frame, the other upright means of the winch frame having aperture means for receiving a cable;

secondary cable means for transmitting motion to a vehicle and to a camera cart, the secondary cable means comprising first and second cable asemblies;

a subject vehicle to be photographed coupled to the first cable assembly;

platform means for supporting the cart, the platform means comprising a base and a plurality of wheels supporting the base; the base having a smooth top surface for receiving the cart;

the cart being longitudinally moveable within the platform means, the cart having a plurality of laterally disposed wheels axially mounted normal to the base for moving the cart in a longitudinal direction and stabilizing the transverse motion of the cart with respect to the platform means;

large format camera means adjustably, yet rigidly mounted on the cart;

parallel guide rails disposed normal to and along the longitudinal length of the platform, the laterally disposed wheels of the cart engaging the parallel guide rails to maintain transverse stability of the cart within the platform means; and means coupled to the cart for increasing the inertial movement of the cart and for dampening vibrations;

whereby a rotation of the winch and motor means causes the cable assembly to simultaneously pull the vehicle and the cart within the frame, the cart moving along a stabilized substantially vibration free path to capture on large format film, the illusion of motion of the vehicle.

13. The invention as set forth in claim 12 and having linkage means comprising:

a longitudinal member;

a parallel pair of spaced apart upright members mounted to the longitudinal member and a base member and a base member mounted to each of the longtudinal members, the base members for supporting the linkage means in an upright position;

cable guides supported by and adjacent the upright members, each cable guide comprising a pair of cable engaging rollers, and further comprising groove means in at least one of the rollers for receiving the cable, the rollers comprising a resilient material to dampen vibrations during motion of the cable therethrough.

14. The invention as set forth in claim 12 and in which the winch frame comprises:

base means for supporting the winch frame;

a first upright element for receiving the winch;

winch means mounted to the first upright elements;

a second upright element spaced apart from the first upright element, the second upright element comprising aperture means and a pair of pulleys disposed on opposite sides of the aperture means;

a winch cable coupled form the winch and comprising a cable assembly; and the cable means comprising a pulley coupled to the winch cable, and a pair of dampened secondary cable couplings joined to the first pulley.

15. The invention as set forth in claim 14 in which:

the laterally disposed wheels comprising a pair of double wheels disposed on each side of the cart and an intermediate wheel disposed between each set of double wheels to aid in absorbing vibration which could otherwise result from imperfections in the smoothness of the rails;

the platform comprising a slab of aluminum having a thickness on the order of one inch (3 cm.);

the base frame structure having a weight supported therefrom on the order of 50 pounds (23 kg.) and the means for increasing the inertial load of the subject vehicle having a weight supported therefrom on the order of 60 pounds (27 kg.); and levelor means coupled to the base for adjusting the position of the plane of the base, and in which the primary cable means comprises a doubled cable.

16. A process for photographing in large format the image of a vehicle appearing to be in motion comprising the steps of:

moving a subject vehicle along a first axis;

moving a large format camera over a period of more than one (1) second, while limiting the light passing through the camera to compensate for the time exposure;

buffering longitudinal and transverse vibrations of the camera to maintain a smooth camera motion by the coaction of resilient wheels on a movable cart engaging rails of a fixed platform, the wheels rotating in a lateral plane about a vertical axis.

17. The invention as set forth in claim 16 and in which the exposure time is between five (5) and twenty (20) seconds.

18. The invention as set forth in claim 16 and comprising the step of energizing a winch having a cable arrangement coupled to the subject vehicle and to the cart, whereby a rotation of the winch causes an effective shortening of the cable causing simultaneous motion of the vehicle and the cart.

* * * * *